US009489642B2

(12) United States Patent
Paul et al.

(10) Patent No.: US 9,489,642 B2
(45) Date of Patent: Nov. 8, 2016

(54) FLOW BASED VISUALIZATION OF BUSINESS RULE PROCESSING TRACES

(75) Inventors: Joydeep Paul, Bangalore (IN); Carsten Ziegler, Walldorf (DE)

(73) Assignee: SAP SE, Walldorf (DE)

( * ) Notice: Subject to any disclaimer, the term of this patent is extended or adjusted under 35 U.S.C. 154(b) by 449 days.

(21) Appl. No.: 13/527,313

(22) Filed: Jun. 19, 2012

(65) Prior Publication Data

US 2013/0338980 A1  Dec. 19, 2013

(51) Int. Cl.
*G06G 7/48* (2006.01)
*G06Q 10/00* (2012.01)

(52) U.S. Cl.
CPC .................................. *G06Q 10/00* (2013.01)

(58) Field of Classification Search
CPC ............. G06F 11/3676; G06F 17/30011; G06F 17/30289; G06F 17/30377; G06F 17/30958; G06Q 10/06313; G06Q 10/0633; G06Q 10/067; G06T 11/20
USPC ........... 703/1, 2, 6, 4; 706/52; 717/101, 104, 717/106, 120, 126, 135; 171/101, 104, 106, 171/120, 126, 135
See application file for complete search history.

(56) References Cited

U.S. PATENT DOCUMENTS

| | | | |
|---|---|---|---|
| 6,678,705 B1 * | 1/2004 | Berchtold | G06F 17/30011 |
| 7,281,206 B2 * | 10/2007 | Schnelle et al. | 715/227 |
| 8,839,452 B1 * | 9/2014 | Joy et al. | 726/27 |
| 2004/0034848 A1 * | 2/2004 | Moore | G06N 5/047 717/117 |
| 2006/0047805 A1 * | 3/2006 | Byrd et al. | 709/224 |
| 2007/0061354 A1 * | 3/2007 | Sarkar et al. | 707/102 |
| 2009/0100387 A1 * | 4/2009 | Furukawa | 716/4 |
| 2010/0281064 A1 * | 11/2010 | Ikegami | 707/797 |
| 2013/0073994 A1 * | 3/2013 | Liao et al. | 715/762 |

OTHER PUBLICATIONS

Heilmann, C., Seven JavaScript things I Wish I Knew Much Earlier in M Career, Apr. 20, 2010 http://www.smashingmagazine.com/2010/04/20/seven-javascript-things-i-wish-i-knew-much-earlier-in-my-career/.*
Van Horik, R., Roorda, D., Migration to Intermediate XML for Electronic Data (MIXED) Respository of Durable File Format Conversions, The International Journal of Digital Curation, Issue 2, vol. 6, 2011.*
Swaroop, K., File System Implementation, 2003 EE10329.*
Aziz, A., Mitchell, S., An Introduction to JavaScript Object Notation (JSON) in JavaScript and .NET Feb. 2007 http://msdn.microsoft.com/en-us/library/bb299886.aspx.*

(Continued)

*Primary Examiner* — Aniss Chad
*Assistant Examiner* — Scott S Cook
(74) *Attorney, Agent, or Firm* — Fountainhead Law Group P.C.

(57) ABSTRACT

Embodiments relate to systems and methods for visualizing processing traces as a flow diagram. Certain embodiments allow conversion of a text based processing trace, into an intermediate state which can then be projected using a flow diagram. A model transformation engine receives as an input, a trace log and also a pointer to the trace metadata. The model transformation engine uses the metadata information to convert the trace into a format from which a flow diagram can be built. Such an intermediate state could be, for instance, an XML document or a JSON object. Output of the model transformation engine is then fed to renderer, which reads the XML document or JSON object and displays it onto the screen. Embodiments may be particularly suited for visualizing processing traces of business rules in an enterprise system.

20 Claims, 8 Drawing Sheets

| Step | Type | Status | Value |
|---|---|---|---|
| ▽ ▣ Trace for Get Flight Connections with invoice started on 20.02.2012 13:35:40 by user PAULJOY | Trace | | |
|   ▽ △ Get Flight Connections with invoice | Function | STARTED | |
|     • ⓘ Event Processing | | | |
|     ▽ ▧ Ruleset get flights with invoice | Ruleset | STARTED | |
|       ▽ Ruleset Variables | | | |
|         ○ ▦ Flight Table | Data Object | | ▦ |
|         ○ ▦ Sbook table type | Data Object | | ▦ |
|       • ⓘ Rule processing: (position 1) | | | |
|       ▽ ▧ Rule | Rule | STARTED | |
|         • ⓘ Processing Expression GET_CARRIER | | | |
|         ▽ ▦ Get Carrier and Connection | DB Lookup | STARTED | |
|           • ⓘ DB Lookup is processed in Normal Selection Mode | | | |
|           • ⓘ Performing SELECT on Table SFLIGHT with the given conditions | | | |
|         ○ ▦ Get Carrier and Connection | DB Lookup | FINISHED | ▦ |
|         ▽ Value Change | | | |
|           • ▦ Flight Table | Data Object | UPDATED | ▦ |
|         ○ ▧ Rule | Rule | FINISHED | ▦ |
|       • ⓘ Rule processing: (position 2) | | | |
|       ▽ ▧ Rule | Rule | STARTED | |
|         • ⓘ Processing Expression GET_CARRIER_CONN_SCORE | | | |
|         ▷ ○ Get Carrier Connection Score | Loop | STARTED | |
|         ▽ Value Change | | | |
|           • ▦ Result Table | Data Object | UPDATED | ▦ |
|         ○ ▧ Rule | Rule | FINISHED | ▦ |
|       • ⓘ Rule processing: (position 3) | | | |

(56) References Cited

OTHER PUBLICATIONS

Howard, D. (2003) The Basics of Deployment Flowcharting and Process Mapping. Management—New Style.1st edition, Jun. 2003. Chislehurst, Kent. England.*
Deloitte (Process Transformation: Ways Deloitte is Simplifying BPM with ARIS, ProcessWorld 2010—Washington D.C. Jun. 22, 2010).*
Wieczoewk, M., Import ARIS models from XML, ARIS BPM Community, http://www.ariscommunity.com/users/mwz/2010-06-28-import-aris-model-xml.*
Dvint, XML Schema—Data Types Quick Reference, Ver 1/03.*
Belrose, G., Business-driven IT for SAP—The Model Information Flow, BDIM 2007, May 21, 2007, Munich Germany.*
Howard, D., The Basics of Deployment Flowcharting & Process Mapping: A User's Guide to DFC for Know-how Capture and Process Design, New Style. 1st edition, Jun. 2003.*
Monk, E., Concepts in Enterprise Resource Planning, 2nd Edition, University of Delaware, 2006 ISBN-10: 0619216638.*
Reflect: Defined by The RandomHouse College Dictionary: Revised Edition, 1982 p. 1108.*
Guidelines_2008.pdf, Process Mapping Guidelines: Flowchart Symbols, Feb. 19, 2008 http://www.riversideca.gov/audit/pdf/process%20mapping%20guidelines.pdf.*
Bosch_2011.pdf, Visual Rules Modeler: Economize the Rules Lifecycle with Effective Graphical Tools for both Business and IT, Bosch Software Innovations, Mar. 2011.*
VISIO_Office_2007.pdf Illustrated Business Process with Visio Flowcharts, Microsoft Office, 2007.*
Walsh_2011.pdf, Walsh, I., How to Make Detailed Business Process Flowcharts Easier to Read, Sep. 9, 2011, http://www.klariti.com/technical-writing/2011/09/09/business-process-connectors/.*
Abubakker_2010.pdf, Abubakker, H.T., Practical Guide to Creating Better Looking Process Maps, Six Sigma, Feb. 26, 2010, http://www.isixsigma.com/tools-templates/process-mapping/practical-guide-creating-better-looking-process-maps/.*
Craig's Eclectic Blog, Display Hierarchical Data With Visio and Excel, Dec. 9, 2010, https://craigwatson1962.files.wordpress.com/2010/12/visio_orgchartwizard.png.*
IBM_2008 (Business object and XML Schema definitions (XSDs)—IBM 2008 https://www.google.com/search?q=XML+%22business+object%22+toggle+between+grap . . . ).*
Mendling_2009 (On the Usage of Labels and Icons in Business Process Modeling, International Journal of Information System Modeling and Design, 1 (2) (2009)).*
Lamb, G., Improving Your UI Design Process with Object-Oriented Techniques, Apr. 2001 Visual Basic Developer, Pinnacle Publishing, Inc.*
Eisenberg, J.D., Using XSL Formatting Objects, Part 2, O'Reilly XML.com Jan. 24, 2001 downloaded from http://www.xml.com/pub/a/2001/01/24/xsl-fo/.*
Article entitled "Service Trace Viewer Tool (SvcTraceViewer.exe)", NET Framework 4, printed on Apr. 20, 2012, from website: http://msdn.microsoft.com/en-us/library/ms732023(d=printer).aspx.

* cited by examiner

| Step | Type | Status | Value |
|---|---|---|---|
| ▷ 🔲 Trace for Get Flight Connections with invoice started on 20.02.2012 13:35:40 by user PAULJOY | Trace | | |
| ▽ △ Get Flight Connections with invoice | Function | STARTED | |
| □ 〔i〕Event Processing | | | |
| ▷ 🔲 Ruleset get flights with invoice | Ruleset | STARTED | |
| ▷ Ruleset Variables | | | |
| □ 🔲 Flight Table | Data Object | | 🔳 |
| □ 🔲 Sbook table type | Data Object | | 🔳 |
| □ 〔i〕Rule processing: (position 1) | | | |
| ▽ 🔲 Rule | Rule | STARTED | |
| □ 〔i〕Processing Expression GET_CARRIER | | | |
| ▽ 🔲 Get Carrier and Connection | DB Lookup | STARTED | |
| □ 〔i〕DB Lookup is processed in Normal Selection Mode | | | |
| □ 〔i〕Performing SELECT on Table SFLIGHT with the given conditions | | | |
| □ 🔲 Get Carrier and Connection | DB Lookup | FINISHED | 🔳 |
| ▽ Value Change | | | |
| □ 🔲 Flight Table | Data Object | UPDATED | 🔳 |
| □ 🔲 Rule | Rule | FINISHED | 🔳 |
| □ 〔i〕Rule processing: (position 2) | | | |
| ▽ 🔲 Rule | Rule | STARTED | |
| □ 〔i〕Processing Expression GET_CARRIER_CONN_SCORE | | | |
| ▷ ⊙ Get Carrier Connection Score | Loop | STARTED | |
| ▽ Value Change | | | |
| □ 🔲 Result Table | Data Object | UPDATED | 🔳 |
| □ 🔲 Rule | Rule | FINISHED | 🔳 |
| □ 〔i〕Rule processing: (position 3) | | | |

FIG. 2

FLOW BASED VISUALIZATION OF BUSINESS RULE PROCESSING TRACES

BACKGROUND

Embodiments of the present invention relate to enterprise resource planning, and in particular to visualization of processing traces.

Unless otherwise indicated herein, the approaches described in this section are not prior art to the claims in this application and are not admitted to be prior art by inclusion in this section.

Enterprise Resource Planning (ERP) tools typically rely upon a collection of business rules reproducing the structure and function of the enterprise and its constituent components. Traces comprise an important aspect of any framework for implementing business rules.

With the help of traces, it is possible to track execution steps, which in turn helps to ascertain the accuracy of the business rules. The use of traces also imparts auditability to the business rules, allowing transparency of business policies across organizational units.

Conventionally, traces have been displayed using simple texts. While such textual display may be suitable for smaller traces, as business rules grow more complex the size of the traces may become large and less comprehensible to a business user. Also, in the case of complex business rules, the traces may end up being highly technical and their textual description not particularly user-friendly.

The present disclosure addresses these and other issues with systems and methods allowing flow based visualization of processing traces.

SUMMARY

Embodiments relate to systems and methods for visualizing processing traces as a flow diagram. Certain embodiments allow conversion of a text based processing trace, into an intermediate state which can then be projected using a flow diagram. A model transformation engine receives as an input, a trace log and also a pointer to the trace metadata. The model transformation engine uses the metadata information to convert the trace into a format from which a flow diagram can be built. Such an intermediate state could be, for instance, an XML document or a JSON object. Output of the model transformation engine is then fed to renderer, which reads the XML document or JSON object and displays it onto the screen. Embodiments may be particularly suited for visualizing processing traces of business rules in an enterprise system.

An embodiment of a computer-implemented method comprises causing a model transformation engine to receive as inputs, a raw processing trace and metadata information comprising a trace log and a pointer to metadata. The model transformation engine is caused to use the metadata information to convert the raw trace into an intermediate state output. The model transformation engine is caused to provide the intermediate state output to a rendering engine to generate a flow diagram, and the flow diagram is caused to be displayed on a screen.

An embodiment of a non-transitory computer readable storage medium embodies a computer program for performing a method comprising causing a model transformation engine to receive as inputs, a raw processing trace and metadata information comprising a trace log and a pointer to metadata. The model transformation engine is caused to use the metadata information to convert the raw trace into an intermediate state output. The model transformation engine is caused to provide the intermediate state output to a rendering engine to generate a flow diagram, and the flow diagram is caused to be displayed on a screen.

An embodiment of a computer system comprising one or more processors and a software program executable on said computer system. The software program is configured to cause a model transformation engine to receive as inputs, a raw processing trace and metadata information comprising a trace log and a pointer to metadata. The software program is further configured to cause the model transformation engine to use the metadata information to convert the raw trace into an intermediate state output. The software program is further configured to cause the model transformation engine to provide the intermediate state output to a rendering engine to generate a flow diagram. The software program is also configured to cause the flow diagram to be displayed on a screen.

In certain embodiments the intermediate state output comprises an XML document.

In some embodiments the intermediate state output comprises a JavaScript Object Notation (JSON) object.

According to particular embodiments, the intermediate state output may be persisted to serve as a store for the raw trace.

According to various embodiments the method may further comprise communicating a user input to the model transformation engine, and in response to the user input, causing the flow transformation engine to generate a revised intermediate state output to the rendering engine to generate a different flow diagram.

In some embodiments the different flow diagram comprises a subset of the flow diagram, a more detailed flow diagram, or a less detailed flow diagram.

In particular embodiments the raw processing trace may be displayed in a text format in response to a user input to the flow diagram.

The following detailed description and accompanying drawings provide a better understanding of the nature and advantages of particular embodiments.

BRIEF DESCRIPTION OF THE DRAWINGS

FIG. 2 shows a simplified view of a processing trace visualized in a text format.

DETAILED DESCRIPTION

Described herein are techniques for visualizing processing traces. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments allow a simple text based processing trace, to be converted into a transient model which can then be projected using a flow diagram. While the following discussion focuses upon visualization of a processing trace, embodiments are not so limited and could in general be applied to any technical trace.

Figure 1:
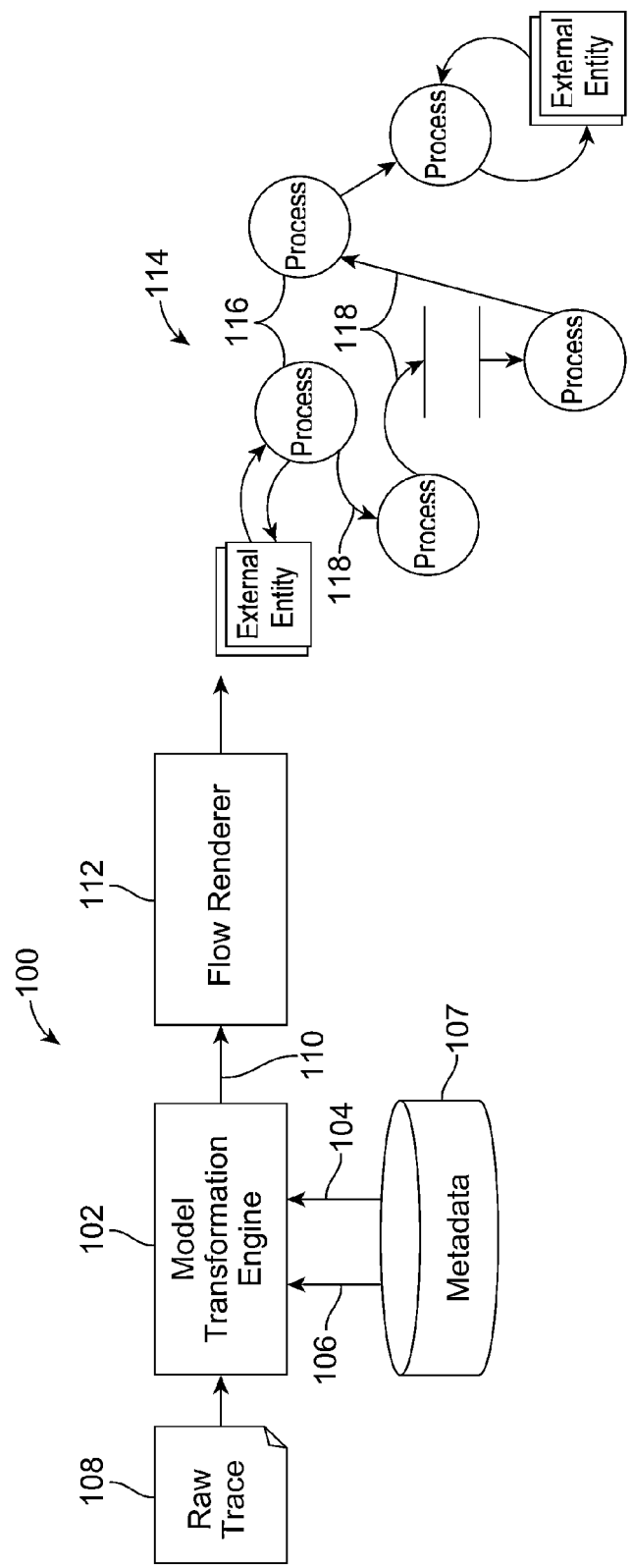
FIG. 1 shows a simplified view of an embodiment of system for visualizing process traces in flow format.

FIG. 1 shows a simplified view of an embodiment of system allowing visualization of process traces in flow format. In particular, the system 100 comprises a model transformation engine 102 that is configured to receive as an input, a trace log 104 and also a pointer to the metadata 107.

The lifecycle of a trace starts with the execution of an application process. In certain embodiments, this may be a business rule.

When a business rule is executed, the steps and intermediate results comprising the trace are persisted in a database. The trace may be persisted in structured form rather than as plain text. The following structure is an illustration:
TRACE_ID|PARENT_ID|OBJECT_ID|VALUE Once the traces are saved in the database, they can later be retrieved. When a user tries to view the trace, an event is triggered. As a response to this event, the model transformation engine commences building up a detailed trace by retrieving the trace records from the database.

For converting the raw traces into a hierarchical format such as XML or JavaScript Object Notation (JSON), the model transformation engine uses metadata including the object relationship and information related to the intermediate result value as for instance the data type (integer, string, etc.). Such metadata comes from application specific persistence (database, flat files etc.).

The output of the model transformation engine can be an XML document or a JSON object. Choosing XML or JSON allows writing not only the value, but also inclusion of information regarding a hierarchy of the objects executed.

Thus FIG. 1 shows that from the inputs 104 and 106, the model transformation engine 102 then uses the metadata information to convert the raw trace 108 into an output 110 in an intermediate state format, onto which a flow diagram can be built. One example of such an intermediate state could be, for instance, an XML document. Another example of such an intermediate state could be a JSON object.

As shown in FIG. 1, the output 110 of the model transformation engine is then fed into a rendering engine 112. This rendering engine reads the intermediate state output 110, and generates a corresponding flow diagram 114.

The rendering engine may be custom made, depending on the particular application. The rendering engine may read the output (e.g. XML or JSON) from the model transformation engine, and build UI entities such as ellipses, rectangles, lines etc. using a suitable UI technology. Examples of such UI technology include but are not limited to UI technologies sold under the trademarks of Silverlight™, Flex™, HTML5, or even JavaScript™.

The flow diagram 114 can subsequently be displayed on a screen to aid a user in visualizing the original process trace. In particular, the flow diagram comprises a plurality of nodes 116, whose relationships relative to each other are indicated by connections 118. In general, flow diagrams are usually quite easily understood, as compared with a document showing many (even hundreds) of text sentences.

This is useful insofar as traces can grow to a very large size when the business rules are very complex, as can be the case for tax calculation rules and other scenarios.

Moreover, in certain instances a business user be interested in reviewing only a portion, rather than the entire processing trace. Such navigation within a flow based trace is easier to accomplish, than picking out a relevant portion of interest from a mass of words offered by a text based trace.

It is further noted that according to certain embodiments, the final rendering from the intermediate format to the flow diagram, is performed on-demand. Accordingly it is possible to persist the raw processing trace in an encoded format. Persistence in this manner may conserve database space, and may also allow for added security.

In a similar fashion, detail information for steps of the processing trace can be derived using flow steps again. For example, an end user may not need to view detail information for each step of the trace.

Taking as an example the system sold under the trademark of BRFplus™ (Business Rule Framework Plus) available from SAP AG, a business user might only need to know which rulesets were executed, since rulesets can have a pre-condition. In such a case, only the ruleset information may be displayed.

Rulesets are the first objects to be executed when a function of the system sold under the trademark of BRFplus™ is executed. The rendering engine need not convert the entire XML or JSON into a flow diagram.

Figure 1A:
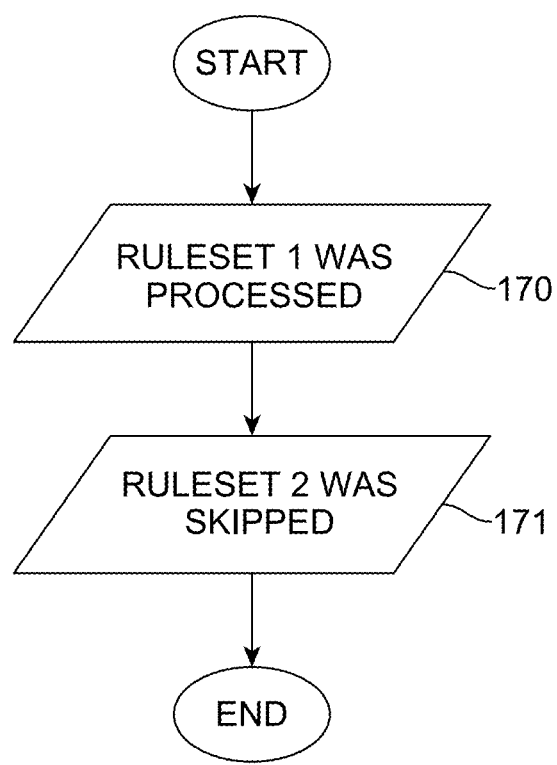
FIG. 1A shows a simplified view of a processing trace visualized as a flow.

FIG. 1A shows an example, wherein only the top level object is shown. When the user triggers an event to view the details for ruleset (e.g. by a mouse click or context menu option), the rendering engine will read the corresponding information from the XML or JSON and display it in the UI.

For illustration, here assume that the user clicked on the second shape 171 in FIG. 1A ('Ruleset 2 was skipped'). The result can be a sample output.

With the advent of newer technologies (e.g. HTML5), it may be possible to render the flow representing the processing trace, with a rich user experience. An example of such a rich user experience could be where a user can click on a diagram like a parallelogram, and the details will be presented.

Figure 1B:
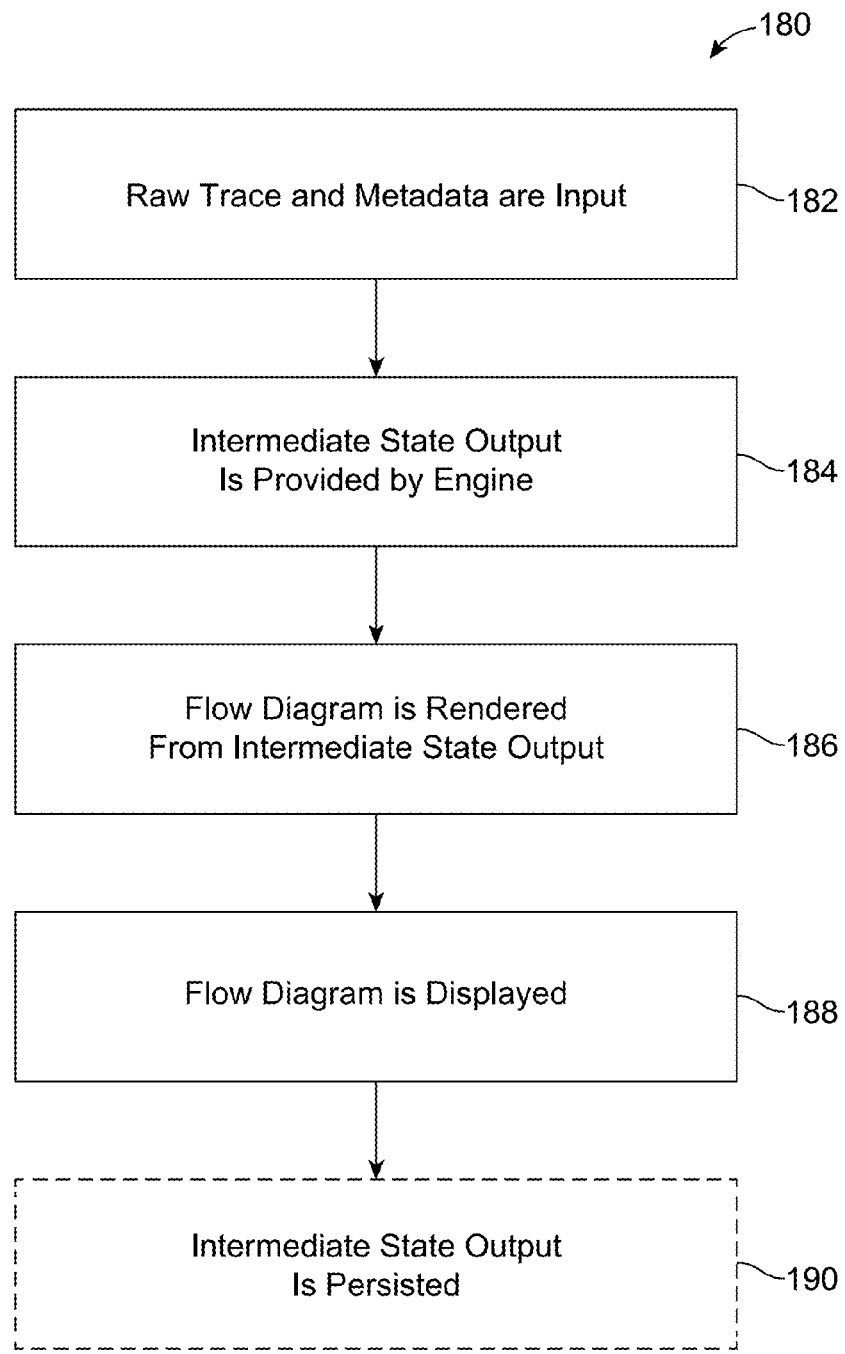
FIG. 1B shows a simplified flow diagram illustrating steps of a method according to one embodiment.

FIG. 1B shows a simplified flow diagram illustrating steps of a method 180 according to an embodiment. In a first step 182, the raw trace and metadata information are input to the model transformation engine. In a second step 184, and intermediate state output is provided by the model transformation engine. In a third step 186, the flow diagram is rendered from the intermediate state output. In a fourth step 188, the flow diagram is displayed. In an optional fifth step 190, the intermediate state output may be persisted.

EXAMPLE

A particular embodiment is now described in connection with visualization of a processing trace arising from a user (PAULJOY) of a business system, seeking to obtain airline flight connections from an invoice stored in the system sold under the Business Rule Framework Plus (BRFplus™) trademark available from SAP AG of Walldorf, Germany.

FIG. 2 shows a view of the resulting processing trace, as visualized in a text format. Various types of entities indicated by various symbols in the textual trace of FIG. 2 include functions, rulesets, rules, data objects, database lookups, and loops. The processing trace as visualized in this text format is relatively complex, offering the user many lines to inspect that are organized according to a multi-tier hierarchical structure.

Figures 3A, 3B:
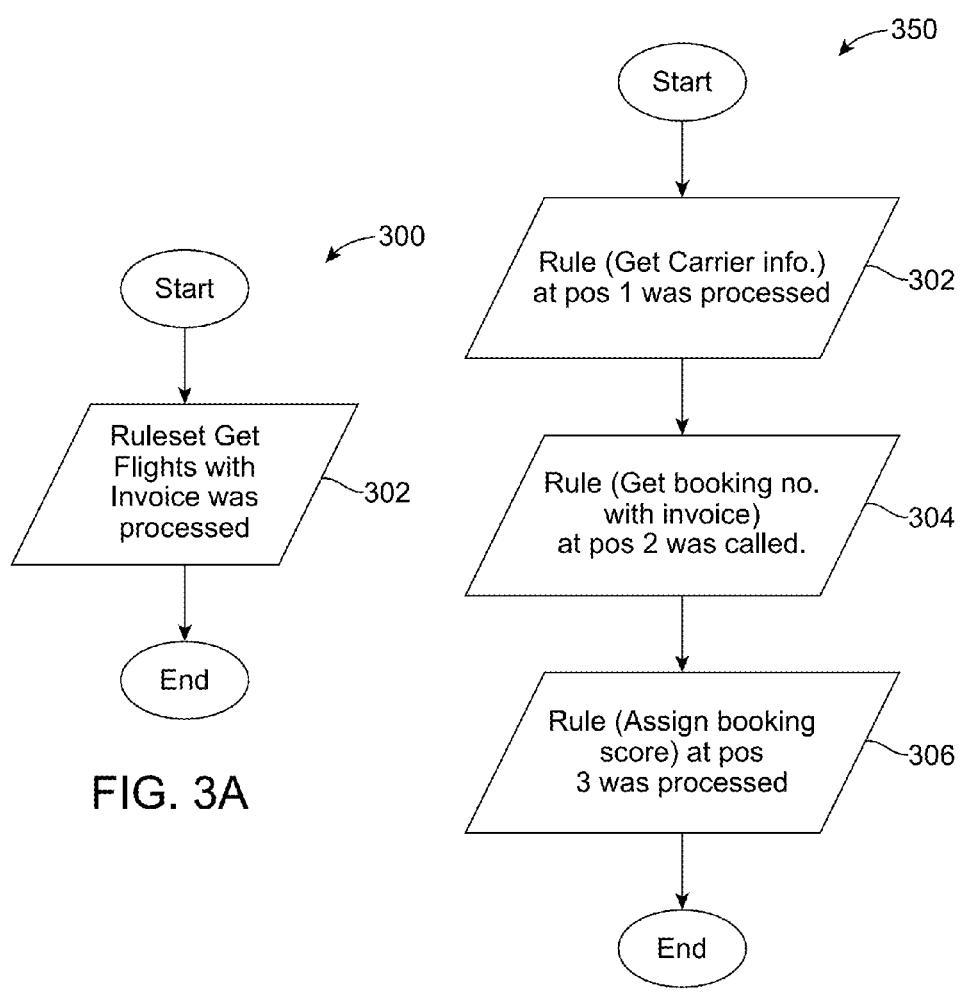
FIG. 3A shows a simplified view of a processing trace visualized as a flow at a first level.
FIG. 3B shows a simplified view of a processing trace visualized as a flow at a second level.

By contrast, FIG. 3A shows a simplified view of this processing trace visualized as a flow diagram 300 at a first level according to an embodiment. In particular, at a highest level of the hierarchy the simplified flow diagram of FIG. 3A shows processing of the ruleset "Get Flights with Invoice" in parallelogram 302.

By manipulating the flow diagram, (e.g. by clicking on the parallelogram 302), a user can obtain further details regarding the processing trace. Thus FIG. 3B shows a simplified view of the processing trace visualized as a flow diagram 350 at a second level of detail. In particular, the original processing trace for the ruleset "Get Flights with Invoice" is now shown as three successive rules: "Get Carrier Info." 304, "Get booking no. with invoice" 306, and "Assign booking score" 306.

Figure 6:
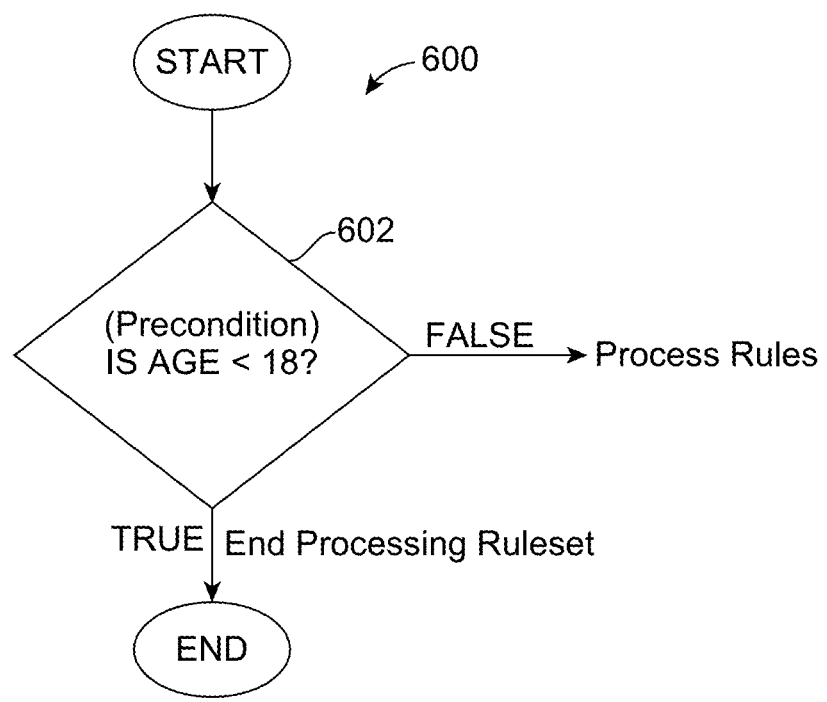
FIG. 6 shows a simplified view of a processing trace visualized as a flow.

Embodiments may include flow diagram(s) where different entities like Data Objects, Functions, Expressions, etc. can be represented by a different shape. For example, FIG. 6 shows a flow 600 wherein the ruleset pre-condition 602 was not satisfied. Hence, the rules were not processed.

Similarly, if the user clicked the first parallelogram 170 of FIG. 1A ('Ruleset 1 was processed'), a different flow diagram could be shown comprising which rules were processed.

The rendering engine need not read and convert the entire XML at one pass. Depending on the user activity and the object hierarchy, the flow can be shown one level after another.

By even further manipulation of the flow diagram, (e.g. by clicking on an element of the flow diagram), a user can obtain still further details regarding the processing trace. It may even be possible to easily toggle between showing the processing trace in text versus flow format.

Moreover, additional information about a processing trace could be imparted through the use of various visual techniques. For example, color and/or animation could be used to indicate status (e.g. finished, started, updated). According to some embodiments, various elements of the processing trace (e.g. internal/external entities, rules, objects, loops, lookups etc.) could be depicted as different shapes (e.g. triangles, circles, rectangles, squares, rhombuses, parallelograms, diamonds). In certain embodiments, processing trace elements could be shown as standardized icons, which may include some text identification.

Certain embodiments may offer various benefits. For example, some embodiments may enhance accessibility and usability of processing traces. In particular, by presenting processing traces in a visual (rather than textual) form, embodiments may allow even a non-technical user to read and understand them.

In addition, as described above the flow visualization may be performed on-demand. This allows the raw traces to be persisted in an encoded format saving database space and increasing security.

Another possible benefit of certain embodiments is interoperability between different systems. In particular, the model transformation engine can be designed to read traces from a variety of applications, and to output the corresponding visualization in a common, generic form.

Still another possible advantage may be ready integration with existing user interfaces. In particular, the trace flow diagram can be easily integrated onto an application screen, for example as a side panel.

Yet another potential benefit according to embodiments is the ability to display processing traces in a level-by-level manner. Rather than being confronted with a mass of textual information (as in FIG. 2), the user is instead able to view the processing traces in the form of a flow, promoting the ability to rapidly and easily discern organization and relevant information. In this manner, the user may be guided to review relevant steps, with less effort.

Figure 4:
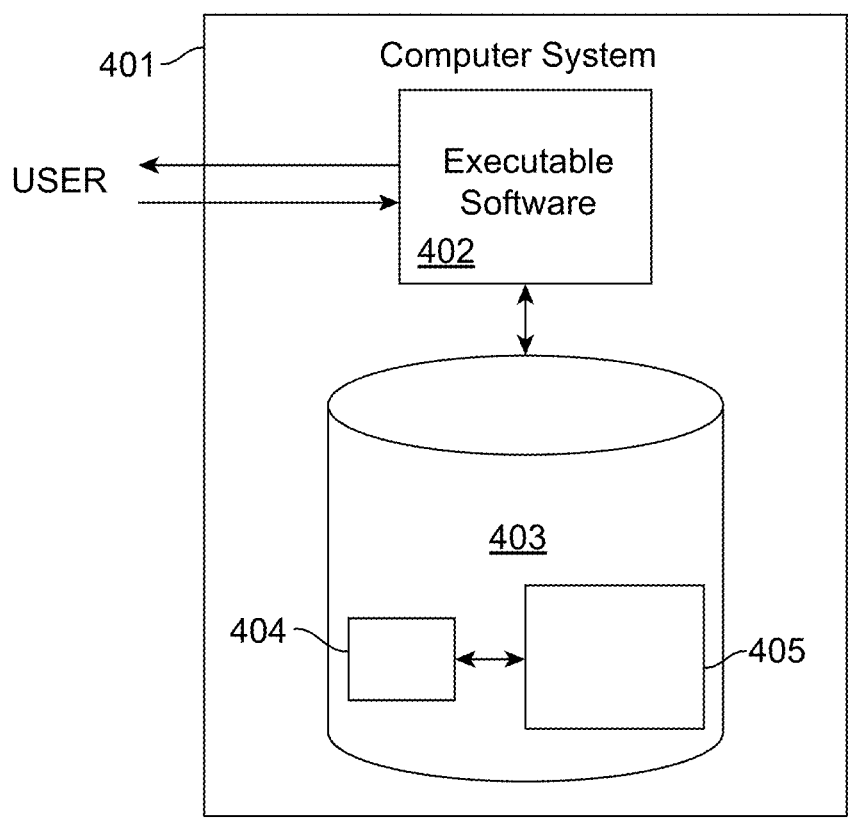
FIG. 4 illustrates hardware of a special purpose computing machine configured to perform processing trace visualization according to an embodiment.

FIG. 4 illustrates hardware of a special purpose computing machine configured to visualize processing traces in flow format according to an embodiment. In particular, computer system 400 comprises a processor 402 that is in electronic communication with a non-transitory computer-readable storage medium 403. This computer-readable storage medium has stored thereon code 405 corresponding to various aspects of a model transformation engine. Code 404 corresponds to a flow rendering engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 5:
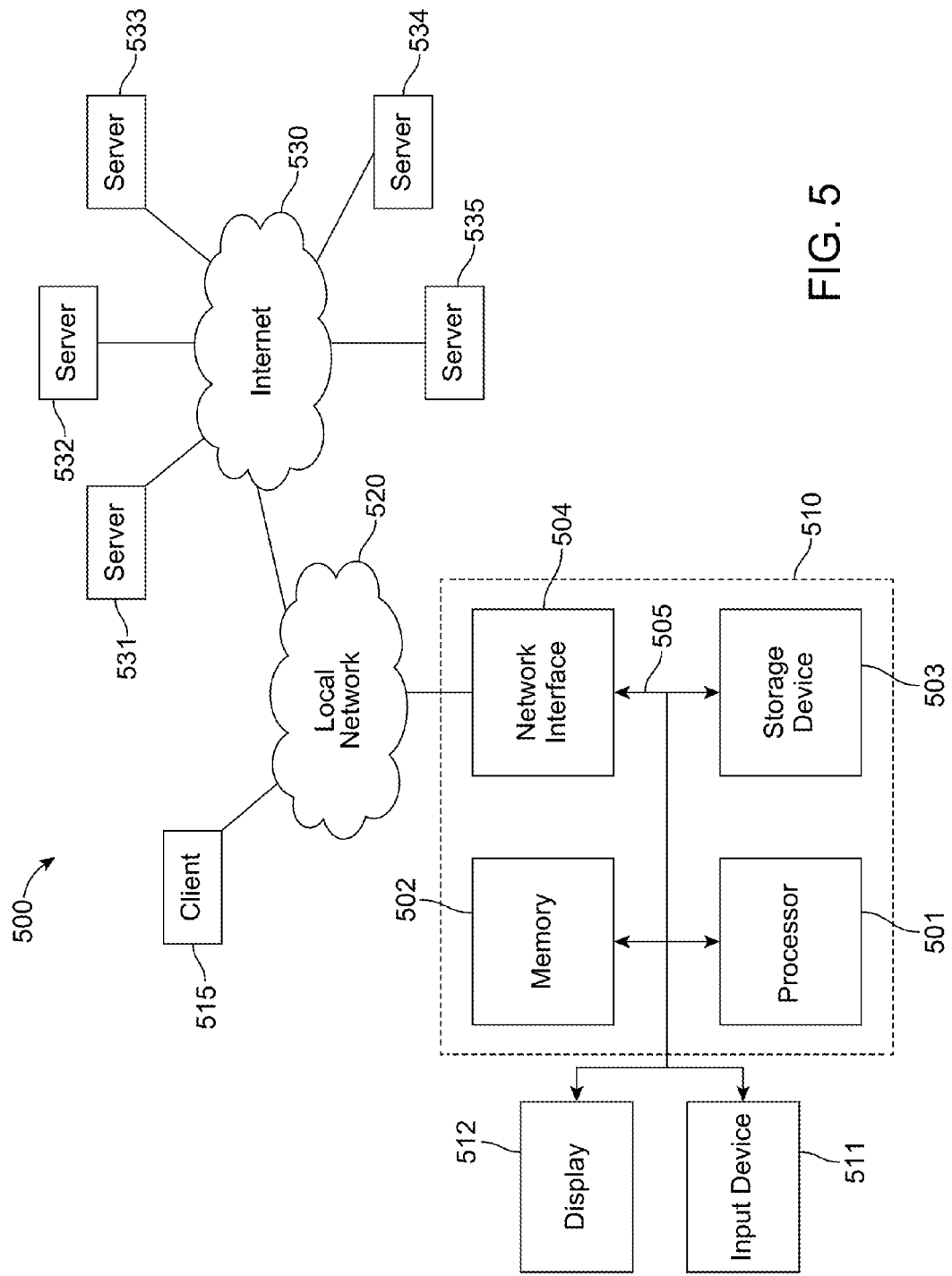
FIG. 5 illustrates an example of a computer system.

An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
causing a model transformation engine to receive as inputs, a raw processing trace persisted in an encoded format and metadata information from application specific persistence, the metadata information comprising a trace log, an object relationship, and information related to an intermediate result value, and a pointer to metadata;
causing the model transformation engine to use the metadata information to convert the raw trace into an intermediate state output comprising a hierarchical format;
on demand, causing the model transformation engine to provide the intermediate state output to a rendering engine to generate a flow diagram comprising a plurality of nodes enclosing a number indicating a numerical node position in a hierarchy of the object relationship;
causing the flow diagram to be displayed on a screen; and
causing a processing trace text format to be displayed, the processing trace text format organized with indentation depth according to a multi-tier hierarchical structure and including an icon indicating a type of entity in the raw processing trace.

2. A method as in claim 1 wherein the intermediate state output comprises an XML document.

3. A method as in claim 1 wherein the intermediate state output comprises a JavaScript Object Notation (JSON) object.

4. A method as in claim 1 further comprising persisting the intermediate state output to serve as a store for the raw trace.

5. A method as in claim 1 further comprising:
communicating a user input to the model transformation engine; and
in response to the user input, causing the flow transformation engine to generate a revised intermediate state output to the rendering engine to generate a different flow diagram.

6. A method as in claim 5 wherein the different flow diagram comprises a subset of the flow diagram, a more detailed flow diagram, or a less detailed flow diagram.

7. A method as in claim 1 further comprising not persisting the intermediate state output.

8. A method as in claim 1 wherein the processing trace text format is displayed by toggling.

9. A method as in claim 1 wherein the flow diagram is integrated onto the screen as a side panel.

10. A method as in claim 1 wherein the type of entity comprises a function, a ruleset, a rule, a data object, a database lookup, or a loop.

11. A non-transitory computer readable storage medium embodying a computer program for performing a method, said method comprising:
causing a model transformation engine to receive as inputs, a raw processing trace and metadata information from application specific persistence, the metadata information comprising a trace log, an object relationship, and information related to an intermediate result value, and a pointer to metadata;
causing the model transformation engine to use the metadata information to convert the raw trace into an intermediate state output comprising a hierarchical format;
persisting the raw processing trace in an encoded format;
on demand, causing the model transformation engine to provide the intermediate state output to a rendering engine to generate a flow diagram comprising a plurality of nodes enclosing a number indicating a numerical node position in a hierarchy of the object relationship;
causing the flow diagram to be displayed on a screen; and
causing a processing trace text format to be displayed, the processing trace text format organized with indentation depth according to a multi-tier hierarchical structure and including an icon indicating a type of entity in the raw processing trace.

12. A non-transitory computer readable storage medium as in claim 11 wherein the intermediate state output comprises an XML document.

13. A non-transitory computer readable storage medium as in claim 11 wherein the intermediate state output comprises a JavaScript Object Notation (JSON) object.

14. A non-transitory computer readable storage medium as in claim 11 wherein the method further comprises persisting the intermediate state output to serve as a store for the raw trace.

15. A non-transitory computer readable storage medium as in claim 11 wherein the method further comprises:
communicating a user input to the model transformation engine; and in response to the user input, causing the flow transformation engine to generate a revised intermediate state output to the rendering engine to generate a different flow diagram.

16. A non-transitory computer readable storage medium as in claim 15 wherein the different flow diagram comprises a subset of the flow diagram, a more detailed flow diagram, or a less detailed flow diagram.

17. A non-transitory computer readable storage medium as in claim 11 wherein the method further comprises not persisting the intermediate state output.

18. A non-transitory computer readable storage medium as in claim 11 wherein the processing trace text format is displayed by toggling.

19. A non-transitory computer readable storage medium as in claim 11 wherein the flow diagram is integrated onto the screen as a side panel.

20. A non-transitory computer readable storage medium as in claim 11 wherein the type of entity comprises a function, a ruleset, a rule, a data object, a database lookup, or a loop.

* * * * *